United States Patent [19]

Fauteux et al.

[11] Patent Number: 5,573,554
[45] Date of Patent: Nov. 12, 1996

[54] CURRENT COLLECTOR DEVICE AND METHOD OF MANUFACTURING SAME

[75] Inventors: Denis G. Fauteux, Acton; Arthur A. Massucco, Natick, both of Mass.

[73] Assignee: Arthur D. Little, Inc., Cambridge, Mass.

[21] Appl. No.: 506,682

[22] Filed: Jul. 25, 1995

Related U.S. Application Data

[60] Division of Ser. No. 396,626, May 1, 1995, which is a continuation-in-part of Ser. No. 325,994, Oct. 19, 1994.

[51] Int. Cl.$^6$ ........................................... H01M 4/04
[52] U.S. Cl. ............................. 29/623.5; 429/245
[58] Field of Search ........................ 429/112, 209, 429/245, 241, 218, 123, 305, 331, 372.2; 29/623.1, 623.5

[56] References Cited

U.S. PATENT DOCUMENTS

| | | | |
|---|---|---|---|
| 4,110,516 | 6/1977 | Breiter | 429/104 |
| 4,216,275 | 8/1980 | Hartmann et al. | 429/104 |
| 4,497,882 | 2/1985 | Mikkor | 429/163 |
| 4,547,442 | 10/1985 | Besenhard et al. | 429/209 |
| 4,948,685 | 8/1990 | Ohsawa et al. | 429/213 |
| 5,047,302 | 9/1991 | Bittihn et al. | 429/213 |
| 5,330,856 | 7/1994 | Gonzalez | 429/212 |

FOREIGN PATENT DOCUMENTS

| | | | |
|---|---|---|---|
| 63-314762 | 12/1988 | Japan | H01M 4/04 |
| 4149960 | 11/1990 | Japan | H01M 4/64 |
| 4215246 | 6/1992 | Japan | H01M 4/02 |
| 9100624 | 1/1991 | WIPO | H01M 4/40 |

*Primary Examiner*—Anthony Skapars
*Attorney, Agent, or Firm*—Dick and Harris

[57] ABSTRACT

A current collector device for an electrolytic cell and method for manufacturing same. The device includes an aluminum current collector having a substantially reduced oxidation layer relative to its native oxide layer, to, in turn, exhibit a relatively low interfacial resistance. A coating of material which includes an etching agent and a primer are both applied to the surface of the aluminum current collector in a single mixture so that actual etching and bonding of the primer to the surface can be accomplished by a single step. It is also contemplated that the primer material act as an electrode material which enables electrochemical activity with the particular ions in an electrolyte within the electrolytic cell.

7 Claims, 1 Drawing Sheet

CURRENT COLLECTOR DEVICE AND METHOD OF MANUFACTURING SAME

This application is a division of application Ser. No. 08/396,626 filed May 1, 1995, (status pending), which is a continuation-in-part of U.S. application Ser. No. 08/325,994, filed on Oct. 19, 1994.

BACKGROUND OF THE INVENTION

1. Field of the Invention

The present invention relates in general to current collectors and methods for manufacturing same, and, more particularly to a current collector device wherein an aluminum current collector having a reduced interfacial resistance, relative to other aluminum current collectors, is utilized.

2. The Prior Art

Various types of current collector devices for use in association with solid and/or liquid electrolytes have been known in the art for several years. For example, when used in association with lithium batteries, such current collectors have typically been constructed from nickel, stainless steel or aluminum. While all of such materials have proven as functional alternatives in such batteries, they do, nonetheless, exhibit several deficiencies.

Specifically, nickel and stainless steel, in addition to high cost, have a relatively high density. As a result of the use of such a relatively high density current collector, electrodes constructed using such a current collector exhibit a relatively low energy density. Furthermore, as known in the art, nickel oxidizes at a potential above 4 volts versus $Li^+/Li^0$, and therefore, nickel current collectors cannot be used effectively at electrode voltages above that value.

Aluminum, on the other hand, which is quite inexpensive and which has a density of only 2.7 g/cc, eliminates the disadvantages associated with the use of nickel and/or stainless steel. Unfortunately, current collectors constructed from aluminum exhibit a relatively high interfacial resistance associated to the presence of a relatively thick native oxide layer which substantially uniformally covers its surface, which, in turn, results in a loss of energy and reduced power. Indeed, such a loss of energy and power is generally attributable to the fact that the aluminum's a native oxide layer 1) acts as an insulator, and thus severely limits electrical conductivity, and 2) greatly hinders adhesion of an electrochemically active electrode material which is to be directly, or indirectly applied to the surface of the aluminum current collector.

It is thus an object of the present invention to provide a current collector device and method of manufacturing same, wherein the device so made includes an aluminum current collector having a substantially reduced interfacial resistance and substantially increased adhesion capabilities relative to the prior art.

It is also an object of the present invention to provide a current collector device and method of manufacturing same, wherein the device has a modified native oxide layer on the surface of the aluminum current collector relative to the native oxide layer on the surface of prior art devices.

It is further an object of the present invention to provide a current collector device and method of manufacturing same, wherein an etching agent and a primer are both applied to the surface of the aluminum current collector in a single mixture so that actual etching of the aluminum oxide layer and adhesion of the primer to the surface of the aluminum can be accomplished by a single step.

These and other objects of the present invention will become apparent in light of the present Specification, Claims and Drawings.

SUMMARY OF THE INVENTION

The present invention comprises a current collector device for an electrolytic cell (or rechargeable battery). The device includes a current collector substantially constructed from aluminum, wherein the aluminum current collector has an interfacial resistance relative to current collection. The device further includes means for lowering the interfacial resistance of the aluminum current collector. In addition, a coating of material is applied to the aluminum current collector. This coating initially comprises an etching agent and/or a primer material or an electrode material; wherein the electrode material enables electrochemical activity with particular ions in an electrolyte within the electrolytic cell.

In a preferred embodiment of the invention, the current collector device further includes means for improving adhesion of a layer of electrode material to the aluminum current collector. Indeed, when the coating of material includes a primer material, it is contemplated that the primer will serve to improve such adhesion.

Also in a preferred embodiment of the invention, the current collector device includes a substantially reduced oxidation layer relative to its native oxide layer. Furthermore, means are provided to substantially preclude regrowth of an oxide layer on the surface of the aluminum current collector. Such means may comprise either the primer material or the electrode material in the coating of material applied to the aluminum current collector.

The primer material in the coating of material may be selected from a group of materials which are substantially electrochemically stable and substantially chemically stable relative to the electrolyte and to the other electrode within the electrolytic cell. Indeed, in one preferred embodiment, the primer material is selected from the group of materials comprising carbon and a transition metal oxide.

In a preferred embodiment of the invention, the coating of material includes organic forms of lithium and manganese, along with graphite and organic acid. It is also contemplated that such materials be bound by a binding agent such as, for example, a polyisobutylene binder. Furthermore, while manganese and graphite have been identified in combination with lithium, it is likewise contemplated that other metals, as well as other carbons, be utilized. For example, the coating of material can be formulated with carbon black and/or a carbon black and graphite blend. Alternative metals may include nickel, cobalt and other metal and mixed metal organic salts, to name a few. Of course, acceptable alternatives would be ascertained by those with ordinary skill in the art.

The present invention also contemplates a method of manufacturing an aluminum current collector for an electrolytic cell, wherein the aluminum current collector includes a surface layer and a native oxide layer thereon. The method comprises the steps of a) applying a coating of material to the surface of the aluminum current collector, wherein the coating of material includes organic forms of lithium, at least one other metal and an acid; b) allowing the acid in the coating of material to substantially reduce and/or disrupt the native oxide layer from the aluminum current collector to, in turn, substantially lower interfacial resistance of the aluminum current collector; and, c) substantially evaporating the acid in the coating of material after the substantial removal of the native oxide layer, and then, in turn, bonding the remainder of the coating of material to the surface of the aluminum current collector, wherein the bonded remainder of the coating of material acts as at least one of a primer material or an electrode material.

In a preferred embodiment, the step of allowing the acid in the coating of material to substantially remove the native oxide layer from the aluminum current collector further includes the step of converting the hydrophobic surface layer of the aluminum current collector to a surface layer which is substantially hydrophilic.

Also in a preferred embodiment, wherein the bonded remainder of the coating of material acts as a primer material, the method further comprises the step of applying, and, in turn, adhering, a separate layer of electrode material to the primer material.

In another preferred embodiment, the step of substantially evaporating the acid in the coating of material and, in turn, the step of forming the at least one of the primer or electrode material comprises the step of heating the coating of material. Of course other conventional curing and/or partial curing procedures are also contemplated for use.

In a preferred embodiment, the step of applying the coating of material to the aluminum current collector includes the step of producing the coating of material to include organic forms of lithium and manganese, as well as carbon (such as graphite) and organic acid.

BEST MODE FOR CARRYING OUT THE INVENTION

Figure 1:
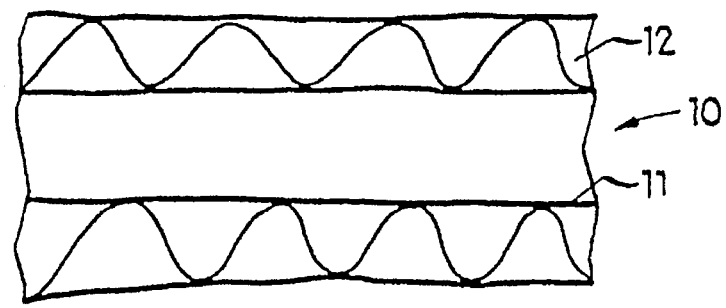
FIG. 1 is a sectional view of a prior art aluminum current collector.

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments illustrated.

A sectional view of a prior art aluminum current collector 10 is shown in FIG. 1 as comprising surface 11 and native oxide layer 12. As can be seen, this oxide layer, which typically comprises $Al_2O_3$, is relatively thick and substantially covers the surface of the aluminum current collector. As will be explained, such a relatively thick and substantially uniform covering native oxide layer not only inhibits adhesion of a layer of primer or electrode material to the surface of the current collector, but it also acts as an insulator relative to electronic mobility needed for electrochemical activity—thereby resulting in a current collector having a substantially high interfacial resistance.

Figure 2:
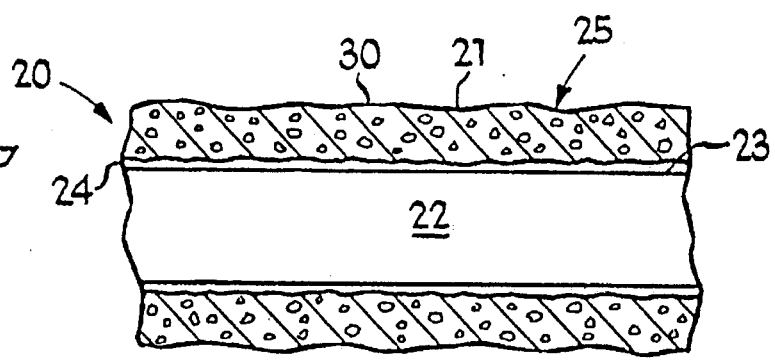
FIG. 2 is a sectional view of a preferred embodiment of the present current collector device.

The present current collector device 20 is shown in FIG. 2 as comprising aluminum current collector 22 having a surface 23, means for lowering interfacial resistance 24 (FIG. 2 and 3, which comprises a substantially reduced, non-$Al_2O_3$ oxidation layer, relative to the prior art) and coating of material 25 applied to the surface of the aluminum current collector. As will be explained in greater detail, coating of material 25 comprises an etching agent 21 and a primer 30 in a single mixture. Such a coating may be formulated with organic forms of lithium and various metals and mixed metal salts (such as manganese, nickel and cobalt, to name a few), along with carbon (such as graphite, a graphite and carbon black blend or carbon black) and acid (such as an organic acid). Furthermore, the coating may also include a binding agent, such as a polyisobutylene binder—although other binding agents as will be ascertainable to those with ordinary skill in the art are likewise contemplated for use.

Figure 3:
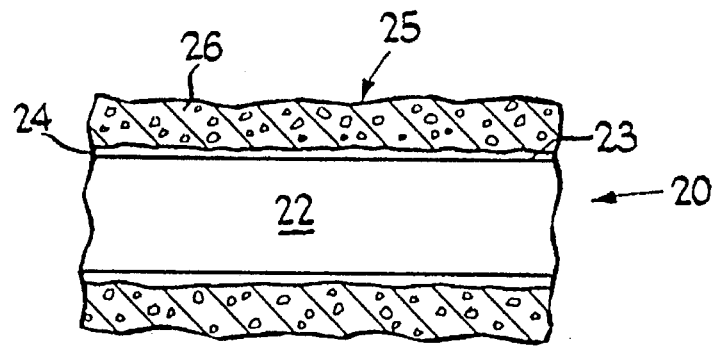
FIG. 3 is a sectional view of the aluminum current collector of the present current collector device.

In addition, it is also contemplated that instead of a primer, the coating of material may alternatively include an electrode material 26 (FIG. 3). However, when a primer material is used, then it is further contemplated that a separate electrode material 26' (FIG. 4) be applied thereto—inasmuch as the primer material will, among other things, serve as a means to increase adhesion of the electrode material to the current collector as well as providing means for substantially precluding re-growth of an oxide layer (such as $Al_2O_3$) on surface 23 of aluminum current collector 22—of course it is also contemplated that even if the primer material also acts as an electrode material, that an additional coating of a separate electrode material can nonetheless be applied to the primer/electrode material.

Specifically, although an oxidation layer may exist on surface 23 of aluminum current collector 22, it will be substantially reduced in thickness (as a result of the etching), relative to the native oxide layer on an untreated, prior art, aluminum current collector, as shown in FIG. 1. Furthermore such a reduced oxidation layer will result in the aluminum current collector having a relatively low interfacial resistance; as well.

Inasmuch as a thick native oxide layer on the surface of the aluminum current collector is undesirable, primer material 30 (FIG. 2) integrated in coating of material 25, is applied to surface 23 of aluminum current collector 22. As will be explained, after acid/etching material 21 has substantially evaporated from the coating of material (FIG. 4), the remaining primer material will, among other things, serve to substantially preclude the re-growth of an oxide layer on surface 23. If desired, a separate layer of electrode material 26' may then be applied to the primer, and in turn, adjacent to electrolyte 40 within an electrolytic cell, as shown in FIG. 4.

Inasmuch as the remaining primer material (means for substantially precluding re-growth of an oxide layer) 30 primarily functions as a protective layer during an electrolytic process, it is preferred that the remaining primer material exhibit both electrochemical and chemical stability relative to the electrolyte and other electrode components (other than aluminum current collector 22), such as electrode 41 (FIG. 4) within an electrolytic cell. Some examples of acceptable primer materials (as previously identified) include, but are not limited to, carbon, such as graphite, a graphite and carbon black mixture or carbon black—although other highly organized and non-organized carbons are likewise contemplated. Alternatively, the primer may comprise a carbon and transition metal oxide compound including, but not limited to, $LiMn_2O_4+C$; $LiCoO_2+C$; or $LiNiO_2+C$, among others. As explained, it is likewise contemplated that coating of material 25 include an etching agent and an electrode material 26 (FIG. 3), as opposed to a primer material. It is contemplated that such an electrode material (in the coating of material) be composed of, for example, carbon and an intercalation compound of a transition metal oxide. Accordingly, such an electrode material would actually serve a dual role, specifically, it would: 1) serve as a means to substantially preclude re-growth of an oxide layer; and 2) as a result of the intercalation compound, enable electrochemical activity with surface 23 of aluminum current collector 22 as well.

Figure 4:
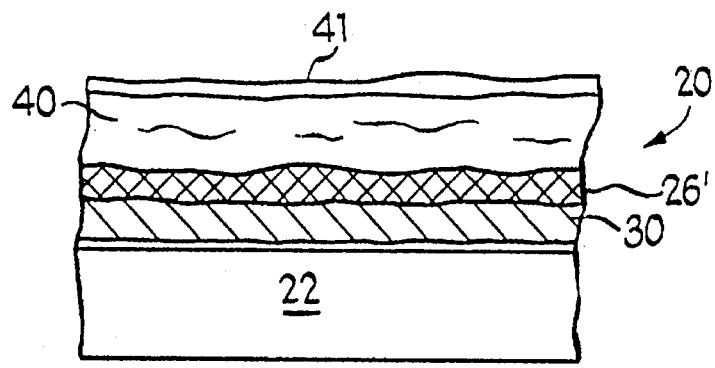
FIG. 4 is a sectional view of the aluminum current collector device.

A separate layer of electrode material 26' is shown in FIG. 4 applied directly to remaining primer material 30, and, in turn, adjacent electrolyte 40. Such an electrode material layer may include a transition metal oxide such as $LiCoO_2$; $LiMn_2O_4$; $LiNiO_2$; $LiV_3O_8$; $V_2O_5$; and $V_6O_{13}$; although other acceptable compounds which enable electrochemical activity with the particular ions (such as lithium ions, in an associated electrolyte), are also contemplated for use.

The method of manufacturing current collector device 20, (FIG. 2) comprises applying a single coating of material 25 to the surface 23 of aluminum current collector 22. As previously explained, coating of material 25 includes etching agent 21, formed from the residual acid of the substances used to formulate coating of material 25, and primer material 30. As also previously explained, the coating of material may alternatively include an electrode material instead of a non-electrode primer material.

In a preferred embodiment, the coating of material includes organic forms of lithium and manganese along with graphite, organic acid and a polyisobutylene binder. The formula for such a preferred coating is as follows:

| | |
|---|---|
| Polyisobutylene, 10% in toluene | 6.19 |
| Lithium ethylhexanoate, 10% in ethylhexanoic acid | 9.38 |
| Manganese ethylhexanoate, 37% in hexane | 42.56 |
| Graphite | 41.87 |
| | 100.00% |

As can be seen, the acid (which will comprise the etching agent) will be derived from the lithium ethylhexanoate solution in the ethylhexanoic acid.

After coating of material 25 is applied to surface 23 of aluminum current collector 22 the acid begins to etch the surface of the aluminum current collector. Such etching serves to substantially disrupt, modify and/or remove native oxide layer 12 (FIG. 1), which may comprise $Al_2O_3$, (typically found on an untreated aluminum current collector), to, in turn, result in an aluminum current collector having a substantially low interfacial resistance relative to prior art aluminum current collectors. In addition, such etching further serves to improve adhesion (through the disruption/modification to the native oxide layer on the aluminum surface) between the remaining primer or electrode material (as will be explained) to surface 23 (FIG. 2) of the aluminum current collector inasmuch as such an etching procedure actually results in a conversion of the surface of the aluminum current collector from one which is initially hydrophobic, to one which is substantially hydrophilic.

After coating of material 25 has been applied, and after a predetermined quantity of etching, the coating of material is at least partially cured so as to result in the evaporation of the acid followed by the bonding of the remaining primer (or electrode) material to surface 23 of aluminum current collector, as shown in FIG. 4. A preferred curing process is to heat treat the coated aluminum current collector at 300° C. for five minutes. After such a heating process, the acid will become substantially evaporated and etching to the surface will substantially cease. In addition, the material from the coating which remains after the acid evaporates will form a secure bond to the surface of the aluminum current collector. As previously mentioned, the remaining material may comprise primer material 30 wherein an electrode material 26' (FIG. 4) would then be applied thereto, or, alternatively, the remaining material may actually comprise the electrode material 26—to which 26' may, or may not, be further applied.

Although not specifically depicted, it will be recognized to those with ordinary skill in the art that the present aluminum current collector may be used in an electrolytic cell, such as a rechargeable lithium battery. Additionally, it will also be recognized that the aluminum current collector may comprise other forms of conventional aluminum current collectors, such as a cathode or another electrode, to name two.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A method of manufacturing an aluminum current collector for an electrolytic cell, wherein the aluminum current collector includes a layer and a native oxide layer thereon, the method comprising the steps of:

applying a coating of material to the surface of the aluminum current collector, wherein the coating of material includes lithium, at least one other metal and an acid;

allowing the acid in the coating of material to modify the native oxide layer on the aluminum current collector to, in turn, lower interfacial resistance of the aluminum current collector;

evaporating the acid in the coating of material after the modification of the native oxide layer, and, in turn, bonding the remainder of the coating of material to the surface of the aluminum current collector, wherein the bonded remainder of the coating of material acts as at least one of a primer material or an electrode material, wherein the electrode material enables electrochemical activity with particular ions in an electrolyte associated with the electrolytic cell.

2. The method according to claim 1 wherein the surface layer of the aluminum current collector is hydrophobic;

the step of allowing the acid in the coating of material to modify the native oxide layer from the aluminum current collector further includes the step of converting the hydrophobic surface layer of the aluminum current collector to a surface layer which is hydrophilic.

3. The invention according to claim 1 wherein the bonded remainder of the coating of material acts as a primer material;

the method further comprising the step of applying, and, in turn, adhering, a layer of electrode material to the primer material.

4. The method according to claim 1 wherein the step of evaporating the acid in the coating of material and, in turn, the step of forming the at least one of the primer or electrode material comprises the step of heating the coating of material.

5. The method according to claim 1 wherein the step of applying the coating of material to the aluminum current collector includes the step of producing the coating of material to include organic forms of lithium and manganese, carbon and acid.

6. The method according to claim 1 wherein the step of applying the coating of material to the aluminum current collector further includes the step of precluding re-growth of an oxide layer on the surface of the aluminum current collector as a result of the bonded remaining primer material.

7. The method according to claim 1 wherein the primer material is selected from the group of materials which are electrochemically stable and chemically stable relative to the electrolyte and another electrode within the electrolytic cell.

\* \* \* \* \*